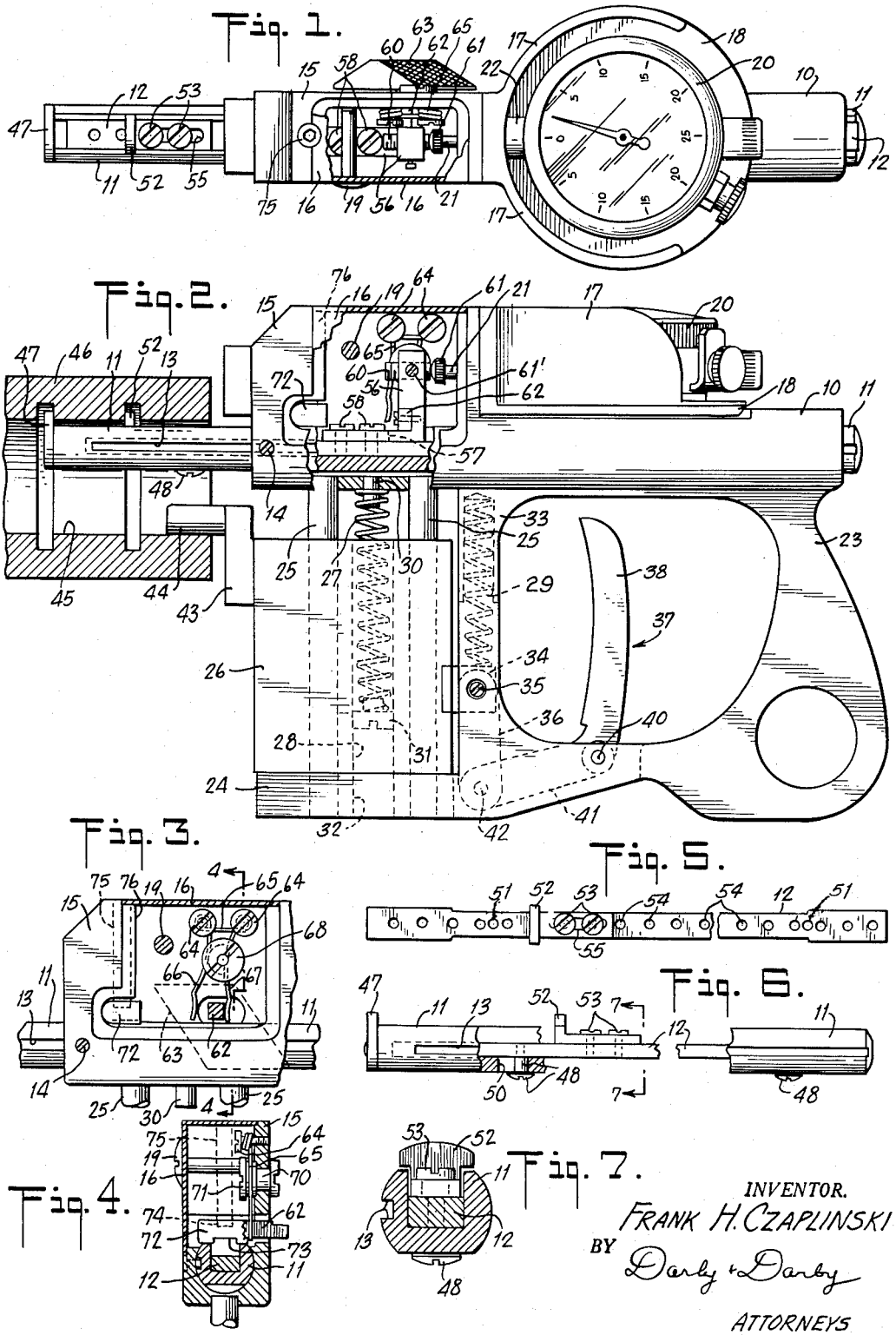

United States Patent Office 2,749,620
Patented June 12, 1956

2,749,620

GROOVE GAGE

Frank Henry Czaplinski, Poughkeepsie, N. Y., assignor to Standard Gage Company, Inc., Poughkeepsie, N. Y., a corporation of New York Application January 12, 1955, Serial No. 481,373

10 Claims. (Cl. 33—147)

The present invention relates to a linear dimension gage and particularly to such a gage adapted to measure the distance between two internal grooves in a bore or the distance between either end of a bore, including a blind bore, and a groove within the bore.

More particularly still the invention relates to such a linear dimension groove gage arranged to readily measure either the distance between the adjacent walls of two grooves or the distance between the remote walls of two grooves. Additionally, the gage of the invention is arranged to measure the distance between grooves over a wide range of placement of such grooves in a bore, that is, whether near the bore entrance or remote therefrom or whether one is near the entrance and one remote.

Moreover, the gage is provided with a dial indicator so that the divergence of a measurement from a predetermined amount may be directly read.

It is an object of the invention to provide a linear dimension dial indicator gage arranged to accurately determine the distance between grooves within a bore.

It is another object of the invention to provide such a gage readily adjustable to measure either the dimension between the adjacent walls of such grooves or the dimension between the remote walls.

It is another object of the invention to provide such a groove locating gage which is readily adjustable to measure the grooves within a bore over a wide range of location as respects depth within the bore.

It is a further object of the invention to provide such a groove locating gage readily adapted to measure the distance between grooves or the depth of the groove within the bore over a wide range of bore diameters and to provide means for inserting the gage within the bores and positioning the gage after such insertion.

It is a still further object of the invention to provide such a groove locating and measuring gage having an accuracy limited only by the accuracy of the dial indicator utilized as a part thereof.

Other objects and features of the invention will be apparent when the following description is considered in connection with the annexed drawings, in which:

Figure 1 is a top plan view of the gage of the instant invention, a portion of the cover plate being broken away in order to show the internal mechanism;

Figure 2 is a side elevation of the groove gage showing the gage inserted in a bore and measuring the distance between the adjacent walls of two circumferential grooves in the wall of that bore. In this view also a portion of the cover plate and housing have been broken away in order to show the internal construction;

Figure 3 is a fragmentary detailed view showing particularly the means for reversing the direction of spring action to convert the gage from one adapted to measure the distance between the adjacent walls of two circumferential grooves within a bore to one for measuring the distance between the remote walls of two such circumferential grooves;

Figure 4 is a fragmentary cross-sectional view showing the spring reversing means mentioned above, the view being taken on the plane of the line 4—4 of Figure 3;

Figure 5 is a top plan view of the measuring bar of the gage;

Figure 6 is a side elevation, partly broken away, showing the measuring bar together with the measuring tube with which it cooperates; and Figure 7 is a transverse cross-sectional view showing the measuring bar and tube of Figure 6, the view being taken on the plane of the line 7—7 of Figure 6.

Referring now to the drawings, there is shown at 10 a barrel in which the measuring tube 11 and the measuring bar 12 are mounted, the bar being movable with respect to the tube as will hereinafter be described and the tube being slidable axially of the barrel, the tube having a keyway or groove extending longitudinally thereof as indicated at 13, Figure 2, into which a setscrew 14 protrudes to prevent rotation of the tube. Formed integrally with the barrel 10 is an upwardly extending generally rectangular housing 15 having an opening at the side and top thereof which is normally closed by the cover plate 16 which plate has, however, been shown broken away in the drawings. The plate 16 is held in position by means of a screw 19 extending through the cover plate and threaded into the rear wall of the rectangular housing 15. Integral with the walls of the rectangular housing 15 and barrel 10 or fixed thereto are the two substantially semi-cylindrical pieces 17 which are formed integrally with a circular base 18, the members 17 and 18 together forming a locating bracket for a dial indicator gage 20. In the right hand wall of the rectangular housing 15 there is an opening through which the measuring plunger 21 and the housing 22 therefor protrude into the space within the housing 15.

Also formed integrally with the barrel 10 is a pistol grip portion 23 by means of which the groove gage may be gripped and positioned in measuring position. Extending between an extension 24 of the pistol grip member 23 and the lower portion of the barrel 10 are two guide rods 25. Mounted on these rods for vertical reciprocatory movement with respect thereto is a block 26, the block being urged downwardly by means of a spring 27 mounted in a bore 28 in the block 26. The upper end of the spring 27 rests against the barrel 10 and is fixed in position by means of a stud 30 which protrudes from the barrel and lies within the terminal coils of the spring 27. A screw 31 is inserted in the bore 28 making it possible to adjust the tension of spring 27, the screw being inserted through a clearance bore 32 in the extension 24. The pistol grip member 23 also includes a vertically extending portion 33 which portion has a bore extending therein, the bore having a slotted opening facing toward the left. Mounted on the block 26 and extending into the slot is a lug 34 which lug is pivotally connected at 35 to a link 36, the link being likewise mounted in a slotted portion of the member 33 of the grip 23.

A bell crank lever 37, having the upper arm 38 thereof in the form of a trigger, is pivotally mounted at 40 in a slotted portion of the horizontally extending bottom member of the pistol grip 23. The other arm 41 of the bell crank 37 is connected at 42 to the link 36. Thus as the trigger 38 is moved toward the rear, that is the right at seen in Figure 2, block 26 is elevated against the pressure of spring 27 and also against the pressure of a spring 29. The spring 29 is provided merely to reduce the tendency of the block the rotate and consequent binding of the bores therein upon the rods 25, the spring 27 being relied upon to return the block to its normal lower position when the trigger 38 is released.

Mounted upon the left hand face of the block 26 is a jaw member 43 which member has a horizontal extension 44 which is curved and which is adapted to seat against the inner surface of a bore such as that shown at 45 in a workpiece 46, Figure 2. The jaw 43 is mounted by any suitable means to the face of the block 26 and is adjustable vertically in order that the instrument may be used in bores of varying diameters. The horizontal extension 44 of the jaw cooperates with the measuring tube 11 to locate the gage in the bore.

As has been indicated hereinabove the tube 11 is a sliding fit in the barrel 10. Mounted at the left hand end of the tube 11 is a gaging member 47 which has a curved upper surface as is clearly seen in Figure 6, the radius of the curvature being relatively small, member 47 being relatively thin in the axial direction. As is seen in Figure 7, the tube 11 is open on its upper side and mounted in the tube 11 for limited horizontal movement with respect thereto is the measuring bar 12, this mounting being effected by means of shouldered screws 48 which extend through elongated openings 50 in the base of tube 11 and are threaded into holes 51 in the bar 12. Adjustably positioned on the bar 12 is a second gaging member 52 having an upper surface which is identical to the upper surface of the member 47. The member 52 is L-shaped the horizontal portion of the L being fixed to the bar 12 by means of screws 53 which screws are threaded into a pair of tapped holes 54 in the bar 12. It will be observed particularly in Figure 5 that a plurality of openings 54 is provided along the bar 12 so that the gaging member 52 may be located in varying positions with respect to the cooperating gaging member 47. The screws 53 extend through a slotted opening 55 in the horizontal portion of the gaging member 52 thereby making possible fine adjustments of the location of member 52 with respect to the bar 12 and the gaging member 47.

Also mounted upon the bar 12 is a bracket 56, see Figures 1 and 2, this bracket lying within the rectangular housing 15 and being L-shaped. Bracket 56 is provided with a slot as indicated at 57 through which the two mounting screws 58 extend, these screws being threaded into two adjacent holes 54 in the bar 12 thus providing for adjustment of the bracket 56 along the bar 12 in increments equal to the distance between center lines of adjacent holes 54 and additionally in lesser amounts by means of adjustment of the bracket through positioning of the slotted opening relative to the screws 58.

The upwardly extending arm of the bracket 56 has a threaded opening therein in which is mounted a screw 60, this screw bearing against the measuring button 61 which is normally mounted on the end of the measuring plunger 21 of a dial indicator such as that shown at 20. The screw 60 is thus movable in a direction parallel to the axis of the barrel 10, tube 11 and bar 12, to adjust the zero position of the dial indicator gage 20, the screw 60 being locked in position by means of the setscrew 61'.

Fixed to the bracket 56 is a rearwardly extending bar or rod 62 which extends through the rear wall of the housing 15 and has fixed thereto an operating member 63, thus making it possible to retract the bar 12 manually against spring tension. Threaded into openings in the rear wall of the housing portion 15 are the screws 64 about which a wire spring 65 is coiled as seen particularly in Figure 1. The downwardly extending ends of the spring 65, designated 66 and 67, lie one on either side of the rod 62 and would both bear against that rod were it not for the provision of a switching cam 68. The cam 68 is best seen in Figures 3 and 4 and comprises the threaded sleeve 70 into which is threaded the screw 71 which screw has an enlarged portion having a slot therein extending substantially for 180° and inwardly substantially to the center of the cylindrical cam portion. The slot mentioned is in alignment with the ends 66 and 67 of the spring 65 and thus as the member 71 is rotated it holds one or the other of the spring ends 66 and 67 out of contact with the rod 62. Reference to Figure 4 will show that the member 70 extends through an opening in the rear wall of the housing 15 and terminates outside thereof in a slotted head. Thus by use of a screwdriver or the like the cam portion 71 may be rotated to cause one or the other of the two spring ends 66 and 67 to be held out of contact with the rod 62. When the end 66 is held out of contact as shown in Figure 3, the end 67 bears against the right hand side of the rod 62 and urges that rod and the parts fixed thereto, including the bar 12 and the gaging member 52, to the left. When this condition obtains the distance between the two gaging members 47 and 52 when inserted in circumferential grooves within a bore will be the distance between the adjacent walls of those circumferential grooves. On the other hand, when the cam 68 is rotated through 180° the spring end 66 will bear against the left hand edge of the rod 62 and the distance between gaging members 47 and 52 when inserted in grooves within a bore will be the distance between the remote faces of those grooves.

As will be obvious the tube 11 must be adjustable in the barrel 10 and must be firmly held in its adjusted position. As has been pointed out hereinabove the tube is slidable within the barrel and is prevented from rotating by means of the keyway 13 and screw 14. In order to clamp the tube in an adjusted position a clamping member 72 is provided this member being located within the housing 15 and being generally rectangular as indicated in Figure 4 having a notched out portion, however, as shown at 73 so that the edges thereof bear against the side walls of the tube 11 while permitting screws 58 to move with the bar 12. The member 72 has a depression in the upper face thereof as is indicated at 74 into which depression the end of a screw 75 extends. The screw 75 is threaded into a boss 76 formed on the inner left hand wall of the housing 15. Thus by tightening the screw the clamping member 72 is caused to bear against the tube 11 and hold it in a fixed position.

Assuming now that the gage just above described is to be utilized to check the distance between two circumferential grooves such as those shown in Figure 2 in the workpiece 46, the following procedure is utilized. The screw 75 is loosened and screws 53 and 58 are removed. The tube 11 is then positioned with respect to the barrel 10 so that the gaging member 47 will reach the left hand groove in the piece 46 without there being any contact between the end of the workpiece 46 and the gage. Additionally, the adjustment is such that the horizontal arm 44 of the jaw 43 will extend into the bore 45 of the workpiece as indicated in Figure 2. The screw 75 is then tightened to clamp the tube 11 in the adjusted position. The gaging member 52 is then placed in position on the bar 12 so that its left hand face will be removed from the right hand face of the gaging member 47 the desired distance between the adjacent faces of the two grooves, and is then firmly fixed to the bar. The bracket 56 is next positioned upon the bar 12 so that the screw 60 rests against the measuring button 61 of the dial indicator which indicator should at this time have a zero reading. Since it has been assumed that the distance to be measured is that between the adjacent faces of the two grooves the cam 68 is rotated so that the end 67 of the spring 65 bears against the rod 62 and urges the gaging member 52 to the left relative to the gaging member 47.

Having set the gage as above described, it is now used to check the distance between grooves of production pieces. This is accomplished in the following manner. With the gage held by means of the pistol grip 23 in the normal manner the trigger 38 is operated to move the curved horizontal extension 44 into engagement with the lower face of tube 11. The tube 11 and member 44 are inserted into the bore 45 of the workpiece after which the trigger 38 is released and the gage moved slightly until the gaging member 47 enters the left hand one of the two grooves. At this time the knob 63 is moved rearwardly against the pressure of spring end 67 until the gaging member 52 engages the right hand one of the two grooves in the workpiece 46. Although the entering of the gaging members 47 and 52 in their respective grooves has been indicated to be sequential, in actual practice the entering will be simultaneous and will occur as the knob 63 is moved rearwardly and released to move the two gaging members toward and away from each other. The operator will exert a pressure axially of the bore in a direction opposite to the pressure exerted by springs 66 or 67 to ensure that the gaging member 47 bears against the proper side of the groove in which it lies. When the gaging members are thus entered in their respective grooves the distance between the adjacent faces of those grooves (compared with the desired distance, to which the gage has already been set in the manner described above) will be indicated on the dial indicator gage 20, it being understood that normally the setting first mentioned will be made by using a master which is accurately finished to the exact dimension desired. Thus the dial indicator will indicate the variation and direction thereof of the piece being checked with respect to the master, and therefore those production pieces which are outside of the predetermined tolerance limits can be rejected.

If, as is frequently the case, it is desired to check the same production pieces as respects the distance between the remote faces of the grooves as well as between the adjacent faces, it is only necessary to rotate the screw 70 and with it the cam 68 through 180° thereby causing the spring end 66 to bear against the rod 62 and urging the gaging members 47 and 52 apart to the maximum extent permitted by the slotted openings 50 in the tube 11. It will be understood that the use of the gage for gaging the distances between both adjacent and remote faces of two grooves above described without resetting the gage, is possible only when the maximum allowed movement of the bar 12 with respect to the tube 11 is greater than the combined width of the two grooves minus the combined width of the two gaging members 47 and 52.

After each checking operation the gage is of course removed from the workpiece by operating the trigger 38 to permit lowering of the gage and removal of the gaging members 47 and 52 from their respective grooves after which the gage can be removed from the bore of the workpiece.

While a preferred embodiment of the invention has been described it will be understood that many modifications and variations of the individual mechanisms can readily be effected without departing from the spirit of the invention. I wish, therefore, to be limited not by the foregoing description, but on the contrary, to be limited solely by the claims granted to me.

What is claimed is:

1. In a gage for determining the linear separation between circumferential grooves in a bore, in combination, a barrel, a tube in said barrel extending beyond one end thereof, said tube being adjustable longitudinally of said barrel, a groove engaging member fixed to the extending end of said tube, a second groove engaging member mounted on said tube for limited longitudinal reciprocation with respect thereto, a dial indicator mounted on said barrel with the measuring plunger thereof parallel to the barrel and tube axes, and means on said second groove engaging member for operating said dial indicator.

2. In a gage for determining the location of grooves within a bore, in combination, a barrel having a grip portion formed integral therewith, a tube mounted for longitudinal reciprocation in said barrel, a groove engaging member fixed on said tube at one end thereof, a slide mounted on said tube for limited longitudinal reciprocation, a second groove engaging member adjustably mounted on said slide, said groove engaging members extending beyond the periphery of said tube in one circumferential direction and being adapted to enter circumferential grooves in a bore, means for indicating the amount of movement of said second groove engaging member longitudinally of said first groove engaging member as said members enter circumferential grooves in a bore, a gage-locating member mounted for reciprocation in a plane extending through the axes of said tube and barrel and parallel to the direction of movement of said slide, said movement of said gage-locating member in said plane being perpendicular to the axis of said tube, means for moving said locating member against said tube to permit said tube and the groove engaging members thereon to enter into a bore, and spring means for urging said locating member away from said tube to cause said locating member and said tube to bear against the bore periphery and to position said groove engaging members in circumferential grooves in said bore.

3. A gage as claimed in claim 1, characterized in that said barrel has an extension thereon, a block supported on said extension for reciprocatory movement in a direction perpendicular to the motion of said slide, said block being spring pressed away from said barrel and further characterized in that a gage locating member is mounted on said block, and a trigger is provided, said trigger being connected by a linkage with said block whereby said block and the locating member fixed thereto may be moved against the barrel and the tube respectively.

4. In a gage for determining the location of grooves within a bore, in combination, a barrel having a grip portion, a tube mounted for longitudinal reciprocation in said barrel, a groove engaging member fixed on said tube at one end thereof, a slide mounted on said tube for limited longitudinal reciprocation, a second groove engaging member adjustably mounted on said slide, said groove engaging members extending beyond the periphery of said tube in one circumferential direction and being adapted to enter circumferential grooves in a bore, a housing extending from said barrel, a bracket fixed to said slide within said housing, and spring means fixed to said housing and bearing against said bracket for urging said bracket and said slide toward its limiting position on said tube.

5. A gage as claimed in claim 4, characterized in that said spring means comprises two spring members, one lying on either side of said bracket, and further characterized in that means are provided for holding one of said springs out of contact with said bracket to thereby cause said other spring to move said slide to its limiting position in one direction.

6. A gage as claimed in claim 5, characterized in that said means for holding one of said spring members out of contact with said bracket comprises a cam rotatably mounted in said housing, said cam lying between said two spring members, rotation of said cam selectively disengaging one or the other of said springs from said bracket thereby determining the direction of movement of said slide with respect to said tube under spring urge.

7. A gage as claimed in claim 6, characterized in that said bracket is provided with an extension and said housing is provided with a slot in which the end of said extension lies and further characterized in that an operating button is fixed to the end of said extension outside said housing whereby said bracket and slide may be manually moved against the pressure of an engaged one of said spring members to thereby position said groove engaging members axially in the circumferential grooves in a bore to determine the distance between the adjacent or remote walls of the circumferential grooves.

8. In a gage for determining the location of grooves within a bore, in combination, a barrel having a grip portion, a tube mounted for longitudinal reciprocation in said barrel, a groove engaging member fixed on said tube at one end thereof, a slide mounted on said tube for limited longitudinal reciprocation, a second groove engaging member adjustably mounted on said slide, said groove engaging members extending beyond the periphery of said tube in one circumferential direction and being adapted to enter circumferential grooves in a bore, a housing extending from said barrel in the same direction as said groove engaging members, a bracket fixed to said slide within said housing, means supporting a dial indicator on said barrel with the measuring plunger thereof extending into said housing, said means locating the measuring plunger in alignment with said bracket to be operated thereby as said slide moves with respect to said tube.

9. A gage as claimed in claim 8, characterized in that said bracket is L-shaped, one arm extending parallel to said slide and the other perpendicular thereto, and further characterized in that said perpendicularly extending arm has a screw threaded therein, said screw being in alignment with and contacting the measuring plunger of said dial indicator.

10. In a gage for determining the location of grooves within a bore, in combination, a barrel having a grip portion, a tube mounted for longitudinal reciprocation in said barrel, a groove engaging member fixed on said tube at one end thereof, a slide mounted on said tube for limited longitudinal reciprocation, a second groove engaging member adjustably mounted on said slide, said groove engaging members extending beyond the periphery of said tube in one circumferential direction and being adapted to enter circumferential grooves in a bore, said groove engaging members lying outside said barrel, means for clamping said tube in an adjusted position with respect to said barrel to permit entry of said groove engaging members to a required depth in a bore, and means for indicating the amount of movement of said second groove engaging member longitudinally with respect to the said first groove engaging member.

References Cited in the file of this patent
UNITED STATES PATENTS 2,643,459   Beers et al. _____ June 30, 1953

FOREIGN PATENTS 738,779   France _____ Dec. 29, 1932